United States Patent [19]

Schumacher

[11] Patent Number: 4,567,515

[45] Date of Patent: Jan. 28, 1986

[54] MULTIPLE IMAGE GENERATION AND ANALYSIS SYSTEM

[75] Inventor: Peter M. Schumacher, Great Falls, Mont.

[73] Assignee: Measuronics Corporation, Charlotte, N.C.

[21] Appl. No.: 486,767

[22] Filed: Apr. 20, 1983

[51] Int. Cl.$^4$ .............................................. H04N 7/18
[52] U.S. Cl. ..................................... 358/107; 358/294; 358/93
[58] Field of Search ................. 358/107, 93, 294, 183; 365/230; 340/707

[56] References Cited

U.S. PATENT DOCUMENTS

| | | | |
|---|---|---|---|
| 3,810,307 | 5/1974 | Cook | 340/173 MP |
| 4,080,659 | 3/1978 | Francini | 364/518 |
| 4,315,282 | 2/1982 | Schumacher | 358/107 |
| 4,449,207 | 5/1984 | Kung et al. | 365/230 |
| 4,475,176 | 10/1984 | Ishii | 365/230 |
| 4,475,181 | 10/1984 | Etoh et al. | 365/230 |

OTHER PUBLICATIONS

IBM Technical Disclosure Bulletin; "Array Logic with Random-Access Memory," vol. 17, #10, Mar. 1975; I. T. Ho.

Primary Examiner—Howard W. Britton
Assistant Examiner—Victor R. Kostak
Attorney, Agent, or Firm—Dorsey & Whitney

[57] ABSTRACT

An extremely versatile approach to image processing is disclosed. A real time same scan video marking and analysis circuit is disclosed which is adaptable to a wide variety of purposes, including same scan logical analysis of data sets obtained from processing the video display. The invention can be advantageously used as part of any video imaging and analysis system for the study and analysis of hard copy images, i.e. still photographs, aerial maps, x-rays, and the like and analysis of moving or living images such as moving components subject to quality control or medical images. The system can operate on a real time same scan basis or analyze and overlay data obtained from analog video images previously recorded on a video cassette recorder. Any data stored or resulting from analysis may be reentered for subsequent and later analysis. Using marking circuitry the images can be created, analyzed and stored in multiple high resolution or low resolution bit planes for analysis. Analytical processes, either electronic or computer based, can be performed and restored in one or more of the multiple digital bit planes for later printout, display, or further analysis.

37 Claims, 14 Drawing Figures

MULTIPLE IMAGE GENERATION AND ANALYSIS SYSTEM

BACKGROUND OF THE INVENTION

This invention is an improvement of a prior invention of applicant disclosed, described and claimed in U.S. Pat. No. 4,315,282, issued on Feb. 9, 1982.

The prior invention disclosed a video imaging and analysis system having multiple inputs including, for example, a video camera, a video cassette recorder, and the like, each input of which could be processed and analyzed using a variety of electronic marking circuits for purposes of creating a forty-eight K digital bit plane overlay, stored in memory. Any or all of the video images and the bit plane could be simultaneously displayed on one or more output displays.

Using the prior invention a 48K memory was employed which enabled the display of 48K pixels (picture elements) of information arranged in a conventional 3×4 aspect ratio raster display format thereby yielding one hundred ninety-two lines of display each containing two hundred fifty-six pixels.

Using the original forty-nine thousand, one hundred fifty-two pixels or picture elements did not take advantage of nor was it affected by interleaving or interlacing of the scanned lines on the raster display. An object of the invention was to obtain square pixels for accuracy of measurement analysis and consequently the first picture element was displayed in both even and odd line scans of the display.

Use of the prior invention has demonstrated a need, in some instances, for higher resolution for purposes of measurement and analysis. In addition, having only one digital bit plane overlay required repeated analysis steps to identify and analyze different spatial or other features of the analog video image being analyzed.

These and other limitations of the prior invention are overcome by the multiple bit plane imaging and analysis system of the present invention.

SUMMARY OF THE INVENTION

The ability to image analog data and display and analyze the data, either digitally or in an analog form, is greatly enhanced by the present invention which comprises a computer controlled memory selection circuit which yields a very powerful tool to comprehend the combinational impact of sets of data.

The invention comprises, in a preferred embodiment, a 48K memory, each memory address containing a byte (8 data bits) of information. By selectively addressing the memory location, selecting data in and out and by selectively writing to or from memory, all on a bit by bit basis, a uniquely powerful digital imaging system is produced.

The computer controlled selection process enables a variety of display modes. Using the invention up to eight digital bit planes of data can be individually, selectively, or simultaneously displayed, each having a resolution of one hundred ninety-two by two hundred fifty-six pixels. Alternatively, two high resolution displays can be obtained and created, each having three hundred eighty-four by lines of five hundred twelve pixels, displayed individually or simultaneously. It is also possible to display any combination of high resolution and low resolution bit planes, simultaneously or separately. And, with additional memory, sixteen, thirty-two or any number of digital bit planes can be achieved using the structure and method of the present invention.

Any of the bit planes, whether high resolution or low resolution, can be selectively displayed in different colors. Simultaneous display of bit planes provides visual analysis and confirmation of data to be analyzed. Alternatively, the informational content of any two or all eight bit planes can be electronically logically analyzed to yield desired data output creating an analysis instrument that can visually display any of the two hundred fifty-six squared possible combinations of the data which is stored in the bit planes. This result is achieved by logical analysis of data and/or by comparing the data in the bit planes with computer command words which identify the criteria of analysis.

The resulting output of any analysis step can also be connected as a video input and stored in one or more of the memory locations for later display or further analysis.

The simultaneous display of all data produces a digital to analog conversion which can be further analyzed for gray scale density and the like.

The present invention fully utilizes the electronic marking implements of the prior patent and, when enhanced by the computing capabilities of the associated computer, produces an unequaled and unparallelled image analyzing system, which can be accomplished on a real time same scan basis.

It is therefore an object of the invention to provide a plurality of synchronized bit planes each of which can be accessed for purposes of storing or displaying information concerning the image being analyzed.

It is an object of the invention to selectively access, store and display data at any desired resolution.

It is an object of the invention to selectively access, and electronically analyze data stored in a plurality of bit planes.

It is an object of the invention to display data from a plurality of images, each of which can be displayed and analyzed simultaneously.

It is an object of the invention to display a plurality of sets of data obtained from an analog image in a plurality of colors for purposes of visual analysis of the image.

These and other objects and advantages of the invention will be evident to those skilled in the art from a review of the appended drawings, the appended claims, and the discussion which follows.

DESCRIPTION OF THE DRAWINGS

FIG. 3, comprising FIGS. 3a–3e, is a schematic diagram of the essential elements of logic circuits capable of analyzing any combination or permutation of the data which is stored in memory.

DESCRIPTION OF THE PREFERRED EMBODIMENT

The present invention is an improvement upon and utilizes the features of U.S. Pat. No. 4,315,282 for Write and Edit Circuitry for Electronic Making of Displayed TV Signal Images, the full disclosure from which is incorporated herein by reference.

Basically, that patent disclosed, described and claimed a unique electronic instrument which could receive a plurality of video images, from cameras or video cassette recorders, and enabled electronic marking of the images with the use of a single digital bit plane overlay.

Using a variety of electronic marking implements, a light pencil, light pen, gray level detection circuitry, or cursor controls, bits could be entered (written) or edited (erased) from the digital bit plane memory and display, using a read-alter-write process or method.

Using the instrument disclosed in the previous patent the video images and the digital bit plane created from the video images could be selectively, alternatively, or simultaneously displayed for purposes of measurement and analysis. Using a color television monitor for the display device in the previous patent enabled the digital bit plane to be displayed in a variety of colors, for example, red for an interrupt which was not stored in memory and green for digital bits obtained from the digital bit plane memory. Using the prior invention real time, same scan entry of data was achieved which enabled precise measurement and analysis, particularly for changing video images.

The present invention greatly enhances the instrument of the prior patent in that not only is there an expanded memory, 30, enabling more data to be displayed and analyzed, a unique method and structure for entering and retrieving data from the expanded memory, 30, is utilized which provides the versatility of addressing each digital bit, D0–D7, in as many as eight digital bit planes, 31–38, as well as the ability to visually or electronically, with logic circuits, analyze each bit of data in the spatial or analog relationship it bears to the other data stored in the bit planes, 31–37.

Figure 2:
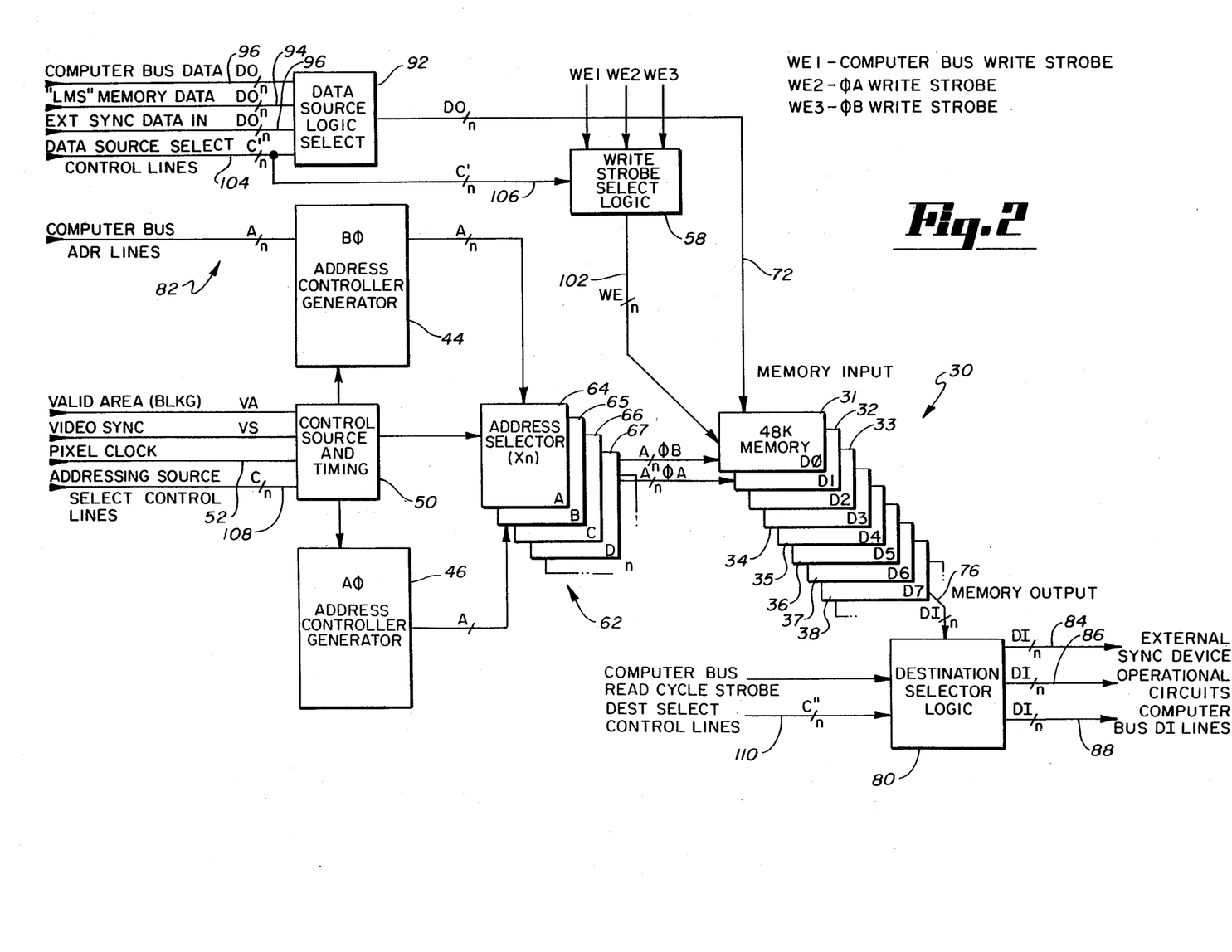
FIG. 2 is a block diagram of the memory control circuits which enable selective accessing of any memory location for purposes of reading or writing to or from that memory location.
Figure 3:
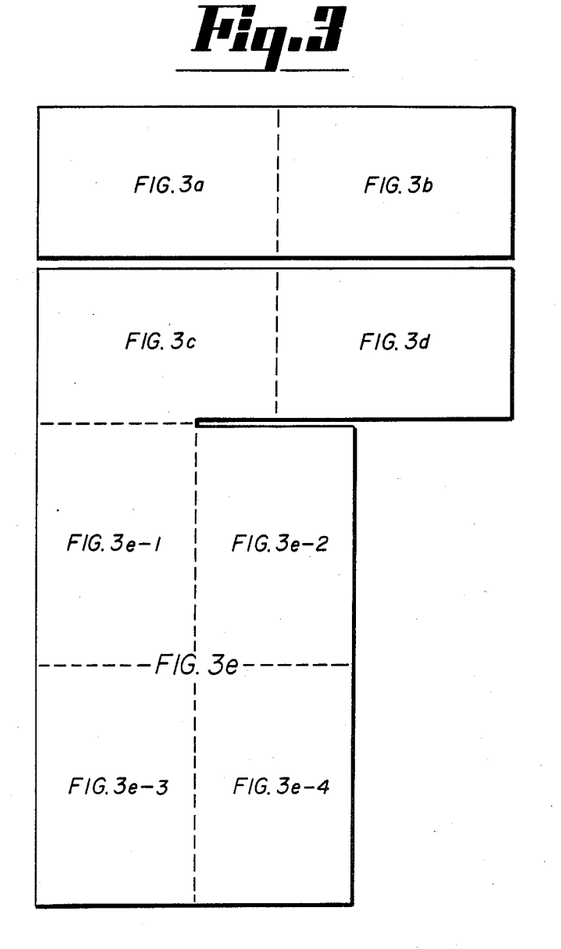

These enhancements are achieved with the selector circuits shown in block diagram form in FIG. 2 and the logic diagrams shown schematically in FIG. 3.

A single digital bit plane having 48K memory bit locations is preferably divided for display into one hundred ninety-two lines of data, each line containing two hundred fifty-six picture elements or pixels. By expanding the memory and addressing each bit individually, in the manner disclosed below, any number of digital bit plane overlays can be created and displayed at any desired resolution.

For purposes of discussion of the invention a preferred embodiment is disclosed having eight individually addressable low resolution digital bit planes. The same memory can also be displayed as two pages of high resolution display on a conventional raster display. It should be obvious that with additional memory and/or using higher density display tubes that even greater resolution can be achieved using the invention in the manner disclosed and described.

Figure 1:
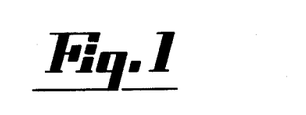
FIG. 1 is a diagram of the display pattern.

FIG. 1 diagrams the format, 40, of the bit storage in each eight bit address location and shows how the bits are accessed to create a plurality of digital bit planes for display.

Figure 1A:
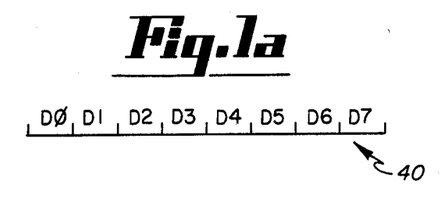
FIG. 1a is a diagram of the bit format of each address.

Each address contains eight bits of data, D0–D7, diagrammed in FIG. 1a. By using the selection circuitry described in connection with FIG. 2, each corresponding bit of each address can be individually accessed for purposes of creation or display of eight individual bit planes. This will produce the eight individual bit planes, such as diagrammed in FIG. 1b for address 000,000, where the first pixel of each line of each scan will display a different bit from address 000,000. Similarly, each bit of address 000,002 and following will be displayed in a like manner in its own bit plane overlay. Therefore, each bit, D0, D1, D2, D3, D4, D5, D6, and D7, will produce a different digital bit plane overlay, each having one hundred ninety-two lines and two hundred fifty-six picture elements per line. By connecting the output to operational circuits, each of the digital bit planes can be displayed in a different color in the manner of the previous single digital bit plane of the prior invention.

Figure 1B:
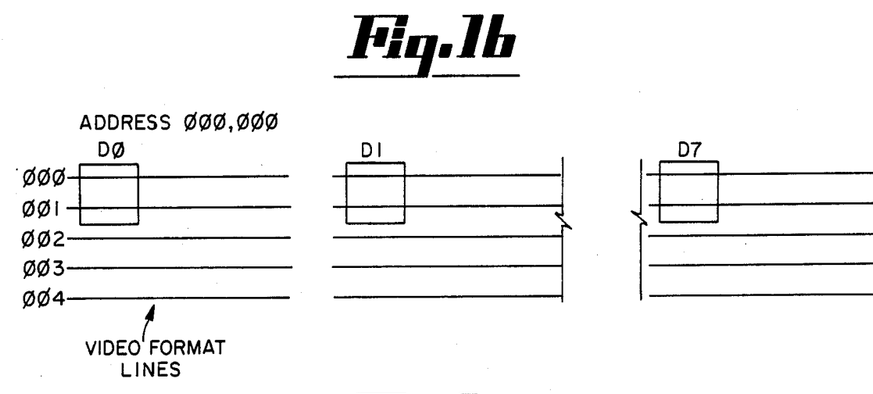
FIG. 1b shows where the bits of the first address are displayed in each of the eight digital bit plane overlays.
Figure 1C:
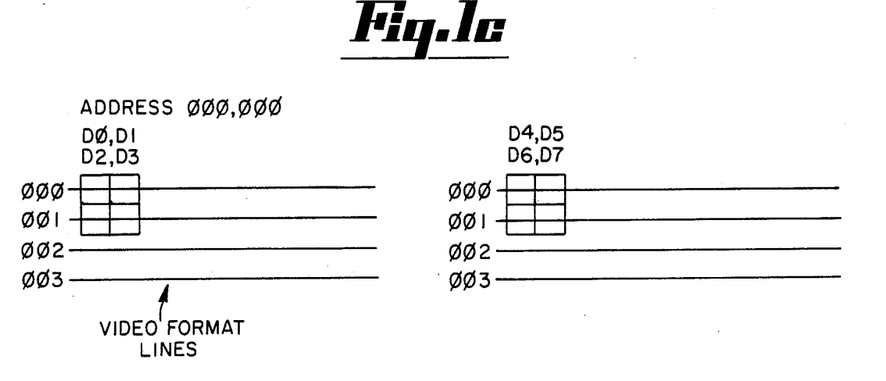
FIG. 1c shows display of that data in two high resolution pages.

FIG. 1c shows selection of the bits which doubles the resolution of the display. This produces two pages of high resolution display, each page having three hundred eighty-four lines and five hundred twelve picture elements per line. To increase the resolution, and still maintain the square picture elements desired for the purpose of making good and accurate measurements, the interlace feature of a conventional raster display having odd and even fields is utilized. Field select is achieved by analyzing the video sync signals and the first two data bits, D0, D1, of the first address are used as the first two picture elements of the first line of display of the first field and the second two data bits, D2, D3, are used as the first two picture elements of the first line of the following field. Subsequent address locations are similarly accessed and displayed.

In a similar manner the remaining four data bits, D4–D7, can be utilized for either a second page of high resolution display as diagrammed in FIG. 1c or, alternatively, each of the four remaining bits, D4–D7, can be used as separate digital bit planes in the manner discussed in connection with FIG. 1b. Because of the ability to selectively address, store, alter, write to or from, or otherwise retrieve data bits from each memory location, each of which is formatted in the manner of FIG. 1a, an extremely versatile imaging and analysis system is provided.

FIG. 2 shows, in block diagram form, the elements which are utilized to manipulate the memory and the data stored therein.

Extreme versatility in accessing data for purposes of analysis is achieved with a plurality of controls, primarily latched computer command words and and associated selector chips, which permit maximum flexibility in addressing, storing and accessing the data for purposes of display and analysis. The address scheme corresponds to the location, line and pixel, where a picture element will be displayed on the display screen. This arrangement is most conveniently shown in block diagram form as in FIG. 2. By using a block diagram, all control parameters can be shown.

The memory, 30, organization and arrangement for the preferred embodiment comprises eight memory cells, 31–38, each consisting of three memory chips, each memory chip capable of storing 16K bits of information. Two address controller-generators, 44, 46, are utilized to address the memory, one address generator, 44, referred to as the B phase or AE address generator and the other, 46, referred to as the A phase or the AI address generator.

Both the A phase address generator, 46, and B phase address generator, 44, are controlled by control logic source and timing circuit, 50. The control logic source and timing circuit, 50, takes as an input, 55, the pixel clock and divides it into two phases, an A phase and a B phase. This provides two clock circuits, A phase and B phase, which are operating one hundred eighty degrees out of phase, two sets of phased addresses, which are operating one hundred eighty degrees out of phase, as well as two write enable gates for purposes of the write strobe select logic circuit, 58, which also operate one hundred eighty degrees out of phase.

All parameters run in video synchronous by virtue of the fact that the control logic source and timing circuit, 50, is also controlled by the video valid area, the blanking circuitry, 54, and the vertical and horizontal sync signals, 55, in the manner discussed in connection with prior U.S. Pat. No. 4,315,282.

To provide the A phase address controller generator, 46, which is shown internally controlled in FIG. 2, four synchronous four bit counters, manufacturer's designation LS161, can be utilized clocked by the A phase clock and sync signals while, for the B phase address controller generator, 44, which can either operate under the B phase clock or computer control, synchronous four bit counters with preset inputs, manufacturer's designation 74193, are preferably utilized. The address selector circuit, 62, takes address lines from both phase generators, both of which address the memory chips, 31–39, the A phase addressing the memory chips, 31, 33, 35 and 37, assigned to the even bit locations, D0, D2, D4, D6, and the B phase generator addressing the memory chips, 32, 34, 36, 38, assigned to the odd bit locations, D1, D3, D5, D7.

Four selector circuits, 64, 65, 66, 67, each operating on a pair of 48K by 1 memory cells are utilized with control of the format being achieved by a four bit command word. Each selector circuit, 64–67, can conveniently utilize four 74LS157 multiplexer chips with address phase mode select inputs. Utilizing multiple selector circuits, 62, permits simultaneous activity to take place with the data stored in the memory, 30. For example, the computer bus address lines, 82, which are connected to the B phase address controller generator, 44, can, through a selector, 64–67, manipulate two of the data bits, D1, D3, D5, or D7, while at the same time another pair of the memory locations can be operating in synchrony with the video rate scanning of an image being analyzed by the system.

As indicated and shown, B phase addressing can be either phase cycled, i.e. one hundred eighty degrees out of phase with the address cycle time of the A phase AI generator, 46, or the B phase addressing can be controlled by the computer. While the preferred embodiment is designed for S-100 bus compatibility such as provided by the Systems Group, Inc. computers, the design is sufficiently flexible that with the provision of handshake wires to the AE, B phase address generator, 44, the multiple image generation and analysis system can be compatible with virtually any computer design. It should also be obvious to those skilled in the art that the A phase generator can also be computer controlled. If the B phase address controller generator, 44, is under computer bus control it is, in essence, doing a DMA (Direct Memory Access) of the memory cells, 31–38. Under computer control all eight cell sets, 31–38, of the 48K memory, 30, can be read or written to in a single data word—eight bit byte—or simultaneous activities can take place, for example, using two bits to record data generated by the light pencil input while reading the remaining six bits for purposes of display or analysis.

In addition to controlling the addresses, the data lines, 72, 76, both into and out of memory, 30, are also controlled. A destination selector circuit, 80, is used to select the destination of data out of memory. Its destination can be logic operators, 84, discussed below, for purposes of analysis, can be the video synchronous display (or other synchronously operating devices), 86, or its destination can be the computer bus, 88.

A data source logic select, 92, is also provided on the input side. The input selector is designed to receive data recycled in from the memory, 94, which may or may not have been altered by logic operations on the data, direct data transfer from an external synchronous device, 96, such as the write/edit circuits of the type discussed in U.S. Pat. No. 4,315,282, or data generated by the computer and input on the computer bus line, 98.

The write pulses on line 102 also have to be coincident with the data and consequently the computer controls the source from which the write pulses come. Write pulses can be generated from synchronous timing, pixel plotting based on the video sync since the address generator is also controlled by the video sync, or they can be derived from bus signaling by the computer. Control lines, 104, 106, 108, 110, for data in and out, write and addressing connect the panel switches, internal controls and/or computer command words for processing and synchronization.

As discussed above, the organization of the 48K, eight bit memory locations is designed for purposes of display of pixels on the display screen, or the display of the analysis of the data sets, which displays can be eight separate displays of two hundred fifty-six pixels by one hundred ninety-two lines, or simultaneous display of two or more sets of those pixels in the same format, or the display of two high resolution pages, each having five hundred twelve pixels on three hundred eighty-four lines, the odd and even field each having one hundred ninety-two lines each. Consequently, the control logic source and timing circuit, 50, for the address controller generators, 44, 46, is clocked at the pixel clock rate, cycles to the first address location 000,000 upon receipt of the video vertical sync pulse and the line and pixel count begins when the blanking pulse ends indicating the edge of the valid area, cycles to the next line of memory, 002,000 upon receipt of the horizontal sync pulse and does not begin counting pixel positions until the valid area blanking circuitry indicates the beginning of the display. These circuit functions are discussed in more detail in U.S. Pat. No. 4,315,282.

In this manner the first data point will always be stored in or accessed from address location 000,000 and the bits in that address will be alternately generated by both generators—A phase and B phase—with D0 under A phase generator control and D1 under B phase generator control and the like. The first three 16K memory chips operate to receive D0 data bits under control of the A phase generator, 46, and the next three 16K memory chips receive D1 data bits under address control of the B phase address generator, 44. Since the two address generators, 44, 46, are operating one hundred eighty degrees out of phase, the entire cycle time for both bits is one hundred sixty nanoseconds to read-alter-write and move to the next address. In this manner relatively slow memory chips, 30, are able to interleave the memory on a pixel by pixel basis throughout the screen.

In the event of a field select in the video, the A phase and B phase generators, 44, 46, remain at the same address but are aimed and guided to two different bits in that address. The first bit on line number 1, the first line in an odd field, goes to data bit 2 under A phase control.

At the same time the second bit on the first line goes to data bit number 3 under B phase control to create the page of five hundred twelve by three hundred eighty-four high resolution display. Field signaling is obtained from the external synchronous input, 96, from the device driving the memory 30 such as video cameras, cassette video recorder, and the like.

When operating in high resolution display the low nibble becomes page one of the display and the high nibble in every memory byte becomes the second high resolution page of display as shown in FIG. 1c. Because the bits are interlaced in the memory it is possible to operate in synchronous and have two pages of high resolution simultaneously operating.

Using this approach, a writing instrument such as that disclosed in U.S. Pat. No. 4,315,282 can be used to cause an interrupt (in red) to be displayed and read on the screen and to store data in any of the digital bit planes. To the extent any data is stored in memory, the memory overlay from the first page memory will be displayed in green. The second page of memory can then be displayed in the color blue by connecting it to the appropriate chroma port of the monitor.

Using this data for visual analysis produces a combinational impact. For example, with previously stored memory when a red interrupt occurs it will produce the color magenta. And where the green overlays the blue, memories occurring in the same place, it will yield the color cyan. Where both memories display data on the screen and an interrupt occurs the color white will be produced and with the condition where no memory interrupts or editing interrupts occur, black will be produced. All can overlay the analog image being analyzed.

Visual analysis allows the operator of the system to produce a minimum of eight different signaling values simultaneously on the screen, using all eight memory cells, each having spatial data stored in the memory for purposes of simultaneous review. In other words, all eight bits displayed during the scan.

For example, assume that a photograph of a person's property is scanned by a video camera and using the editing instrument, the light pencil, level detect, light pen, cursor circuitry or computer graphic capability, identifiable features have been entered into the memory sets. For example, the property lines can be entered into bit D0 locations, all the water shown on the photograph can be entered into D1 bit locations, D2 locations can represent where trees exist, D3 can represent loam soil, D4 where alkaline or saline areas are, D5 can be used for grass areas, D6 for sand, and the like.

Any of this information can be extracted and displayed simultaneously with the video of the photograph and stored as desired for archival purposes, output to printer or plotter, or combined or subtracted and restored as additional memory.

Using the video display of the spatial features decisions can then be made from the analog display.

With a video synchronous playback of the eight bits, each of the bits can be in a different color or in a color weighted entity. For example, D0 can cause the screen not to have any color overlay, in other words, be black and white; bit D1 can cause the color red; bit D2 can cause the color yellow, bit D3 can cause the color green, bit D4 can cause the color cyan, bit D5 can cause the color blue, bit D6 can cause the color magenta, and bit D7 can cause the color white.

Alternatively, the bits can represent gray tonal values, gray density, or the colors can be combined with a degree of saturation where the highest level bit will control the color on the screen with the highest level producing the color white.

With the display of each of the eight bits on the screen the spatial features represented by the bits can then be analyzed. For example, to place an orchard the color combination would be sought which indicates that both trees and loam soil exist on the photograph. Similarly, in order to place a swimming beach the analysis would look for sand adjacent water where there are no trees.

Using the available capabilities of the combination of the stored data and the video imaging system, control is available of intensity of any of the displays, the hue, the color, the saturation, the combinational gray values and the background video relative to each of the data stored in memory. It is further possible to sum or subtract the original imagery or the original images as altered by the data sets. Finally, the results of the analysis can be stored by connecting the output as a video input and and thereafter the results can be altered by the write and edit circuitry available.

In addition to the ability to visually analyze the data bits when displayed in an analog form on the display screen, circuitry is also provided and utilized as logic circuits so that what is displayed and subsequently stored, if that option is chosen by the operator, is data upon which an electronic logical analysis has already taken place by the system.

Figure 3A:
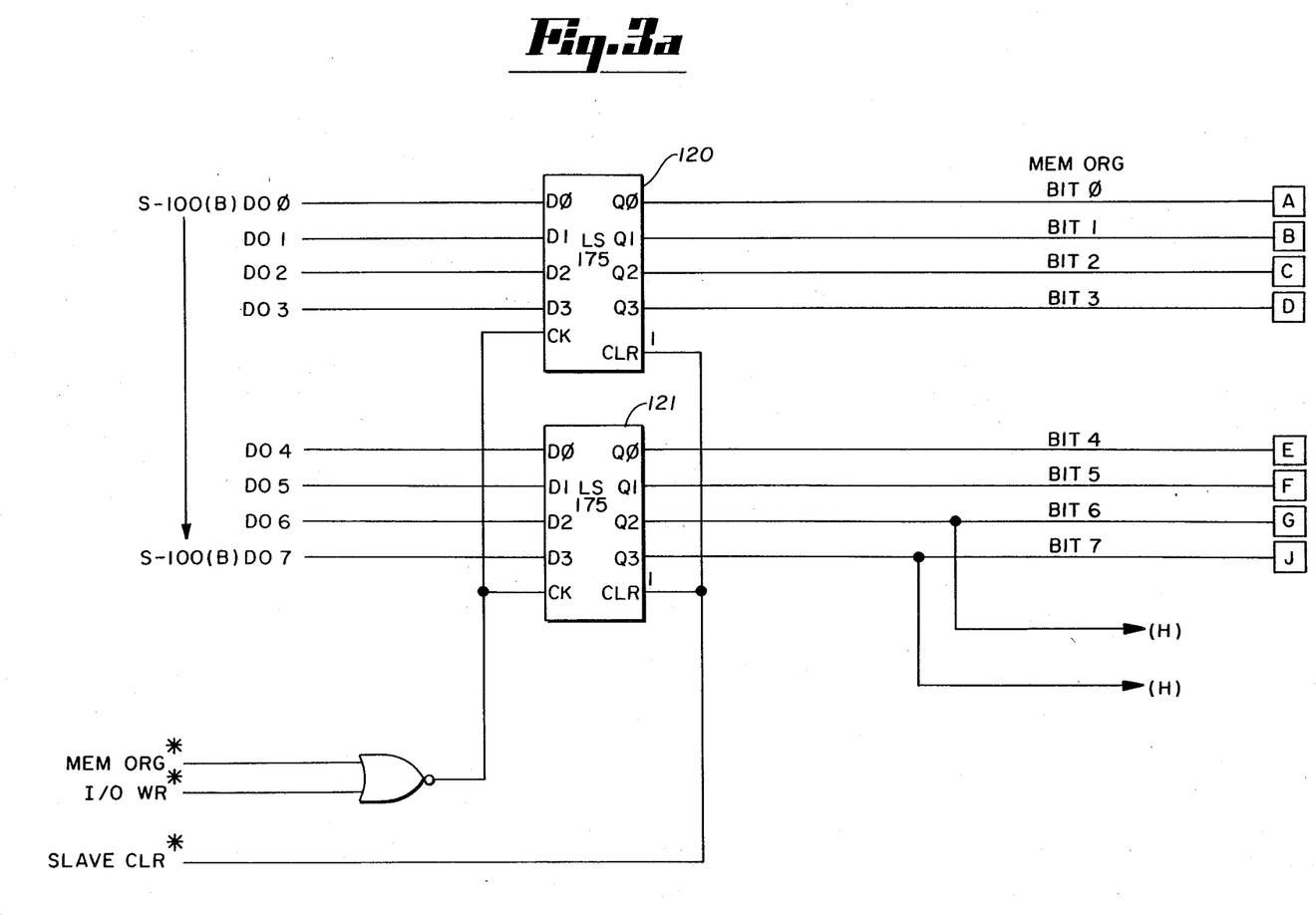
Figure 3B:
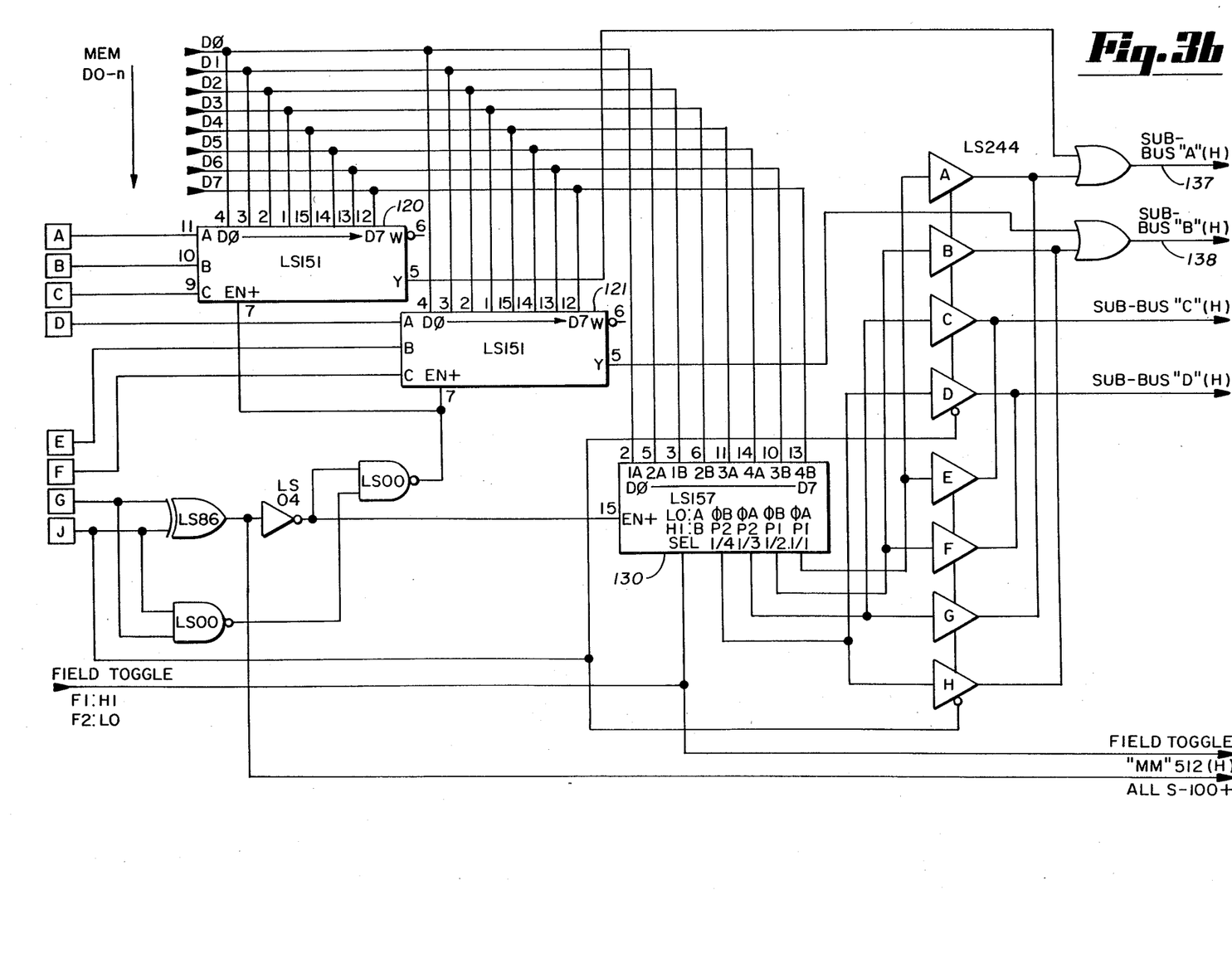

Shown in FIGS. 3a through 3d are the circuit elements necessary to perform paired logic analysis. In other words, the ability to perform a logical operation on any two data bits prior to the time that they are displayed. This is achieved as follows:

As shown on FIG. 3a, a first command word is entered from the computer which is latched by the two LS175 latches, 120, 121, shown in the drawing. This computer command word is then entered into LS151 data selectors, 128, 129, and a LS157 multiple output data selector, 130, shown on FIG. 3b, all of which are also connected to the data bits from the memory. The computer command word therefore causes the two selected data bits to be compared to be connected to the lines designated sub-bus A, 137, and sub-bus B, 138.

Figure 3C:
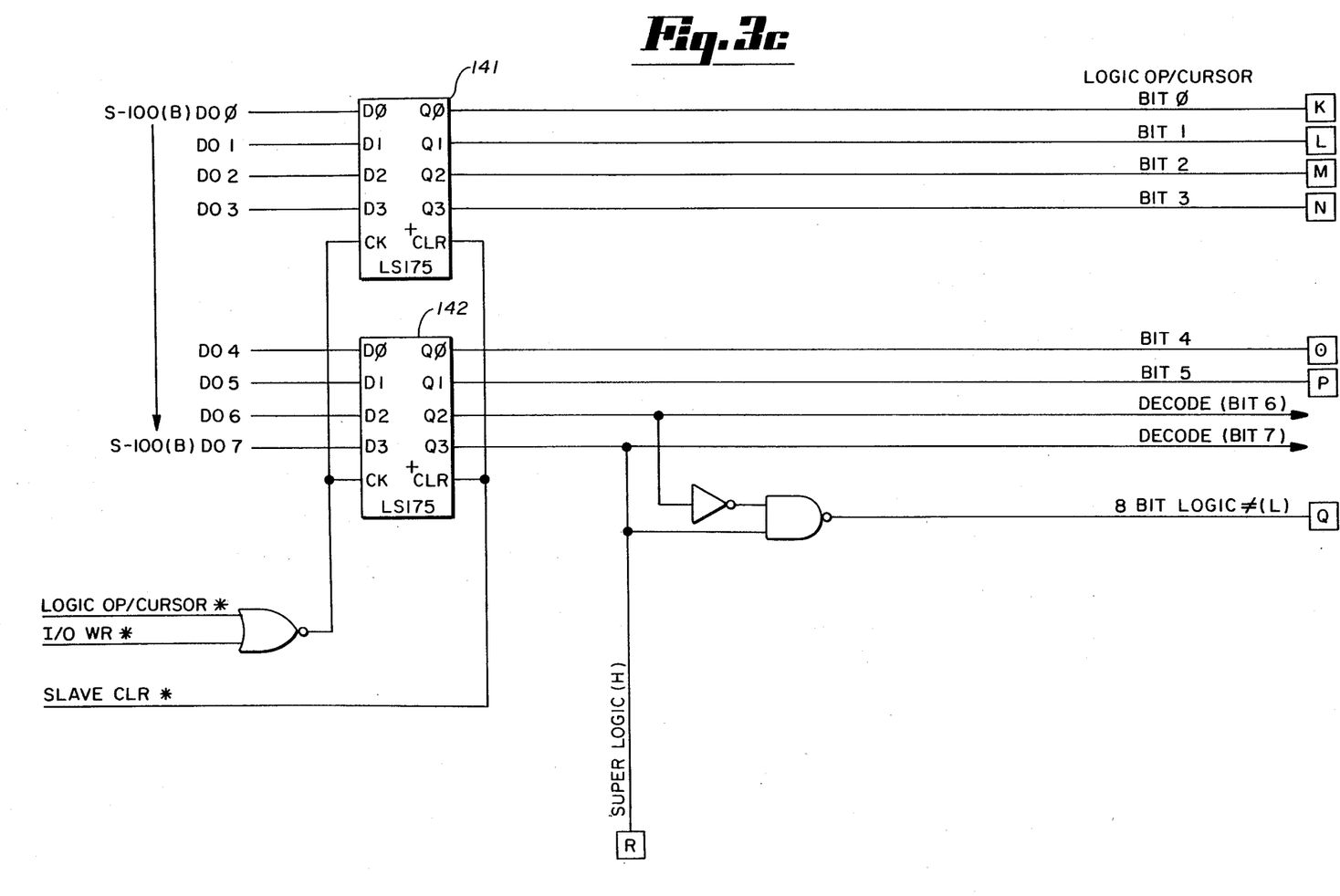

Shown on FIG. 3c are latches, 141, 142, for a second computer command word which is latched for purposes of the logical analysis. This computer command word is connected as shown on FIG. 3d to an LS151 data selector/multiplexer through the logical gates necessary to perform the logical analysis. The two data bits are therefore connected to an AND gate, 145, an OR gate, 146, and an exclusive OR gate, 148, and the output from each is also connected to an inverter, 150-152, to produce an OR function, a NOR function and an exclusive NOR gate. Any data bit connected to sub-bus A can also be run through an inverter, 154, as shown to produce a NEGATE logical function and, with a direct connection, the bit can TRANSFER as stored.

Figure 3D:
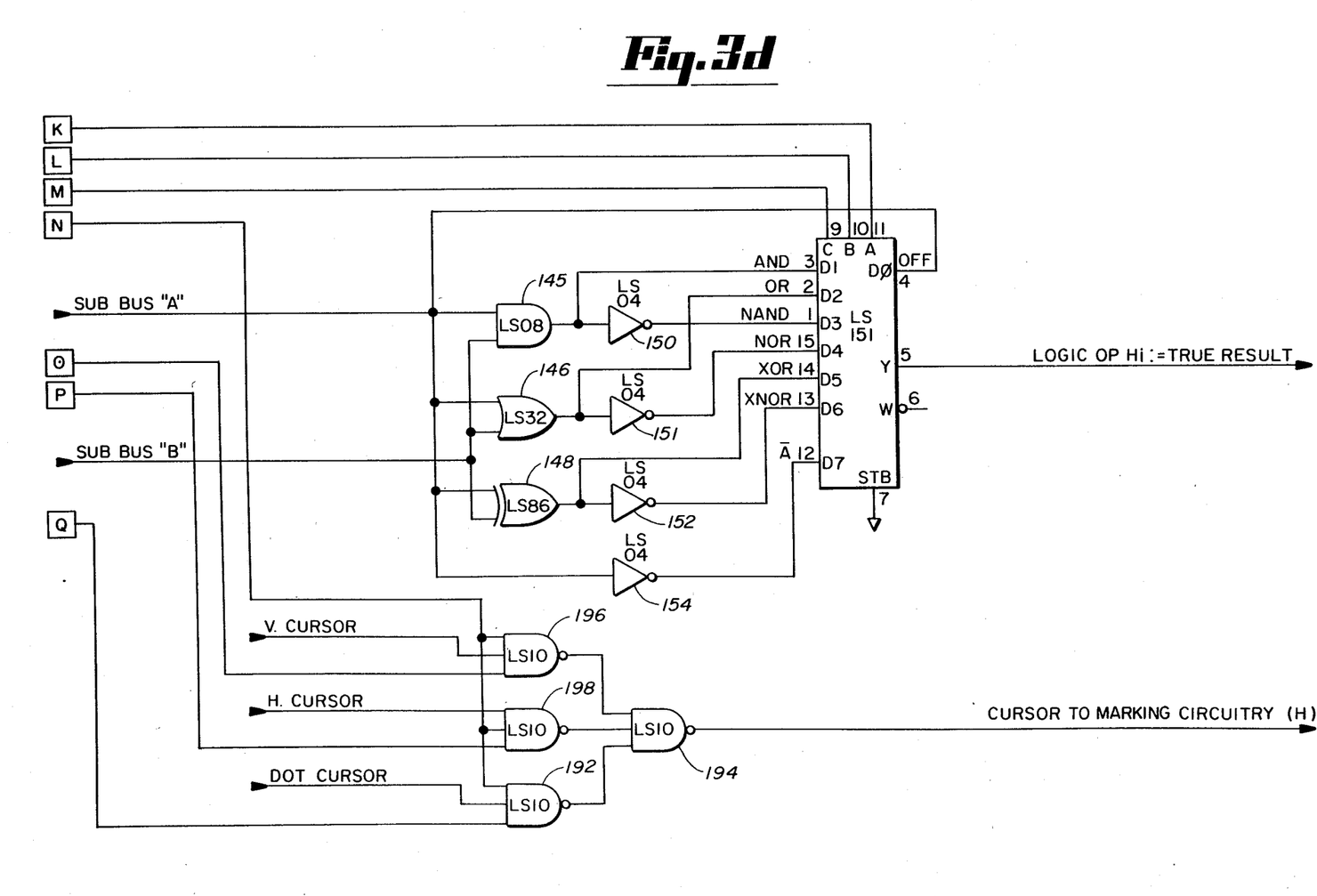
Figure 3E:
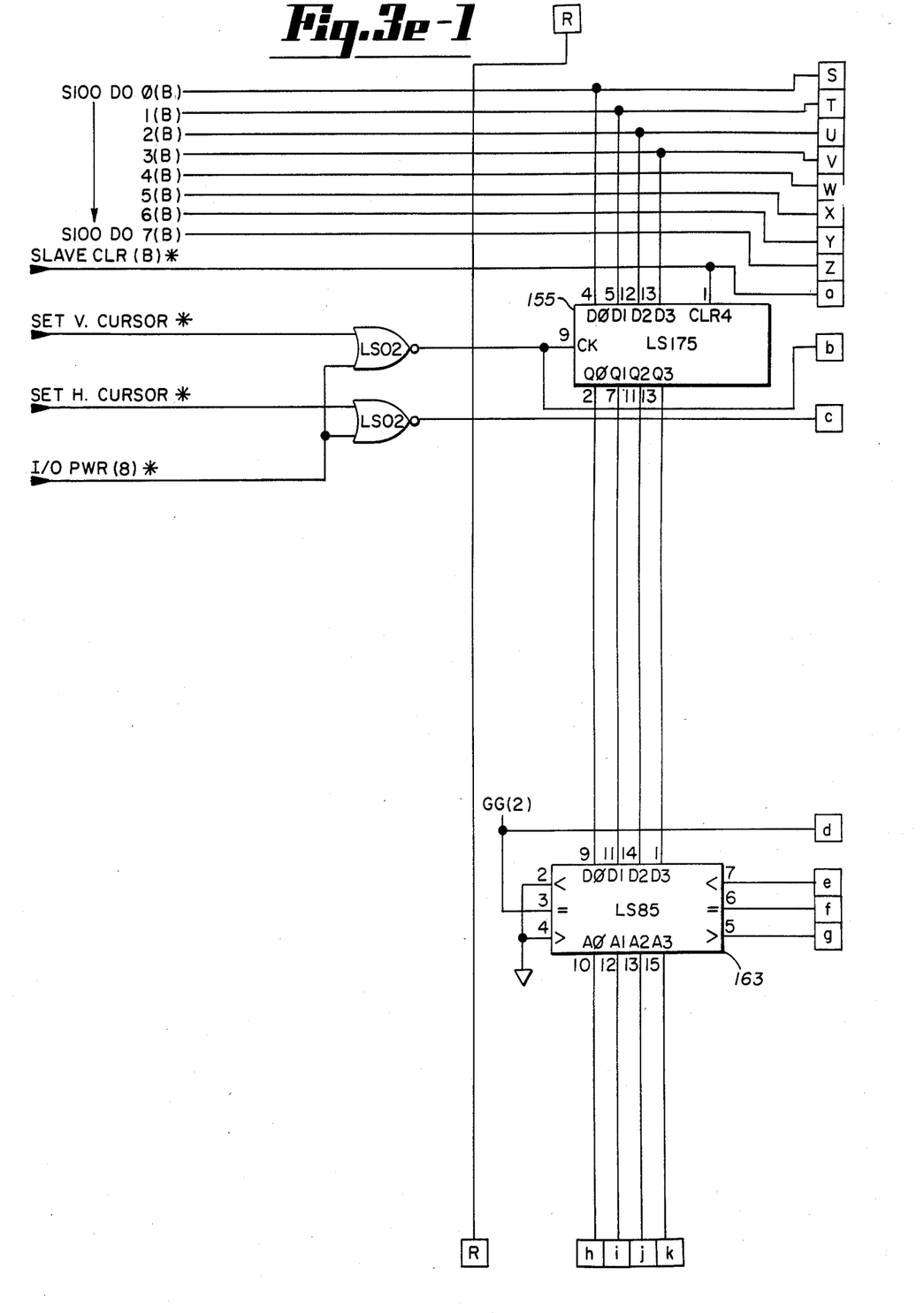
Figure 3E:
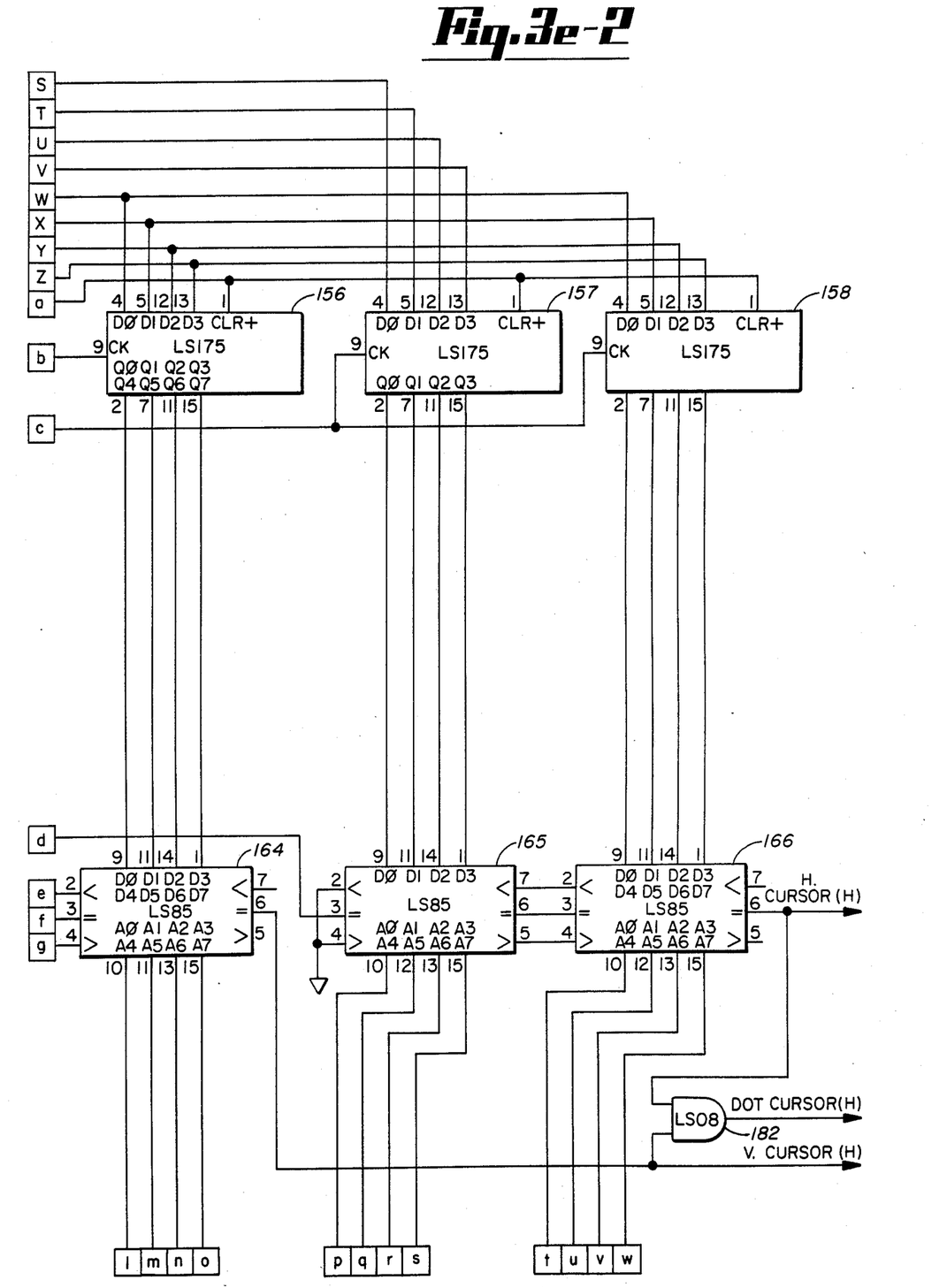
Figure 3E:
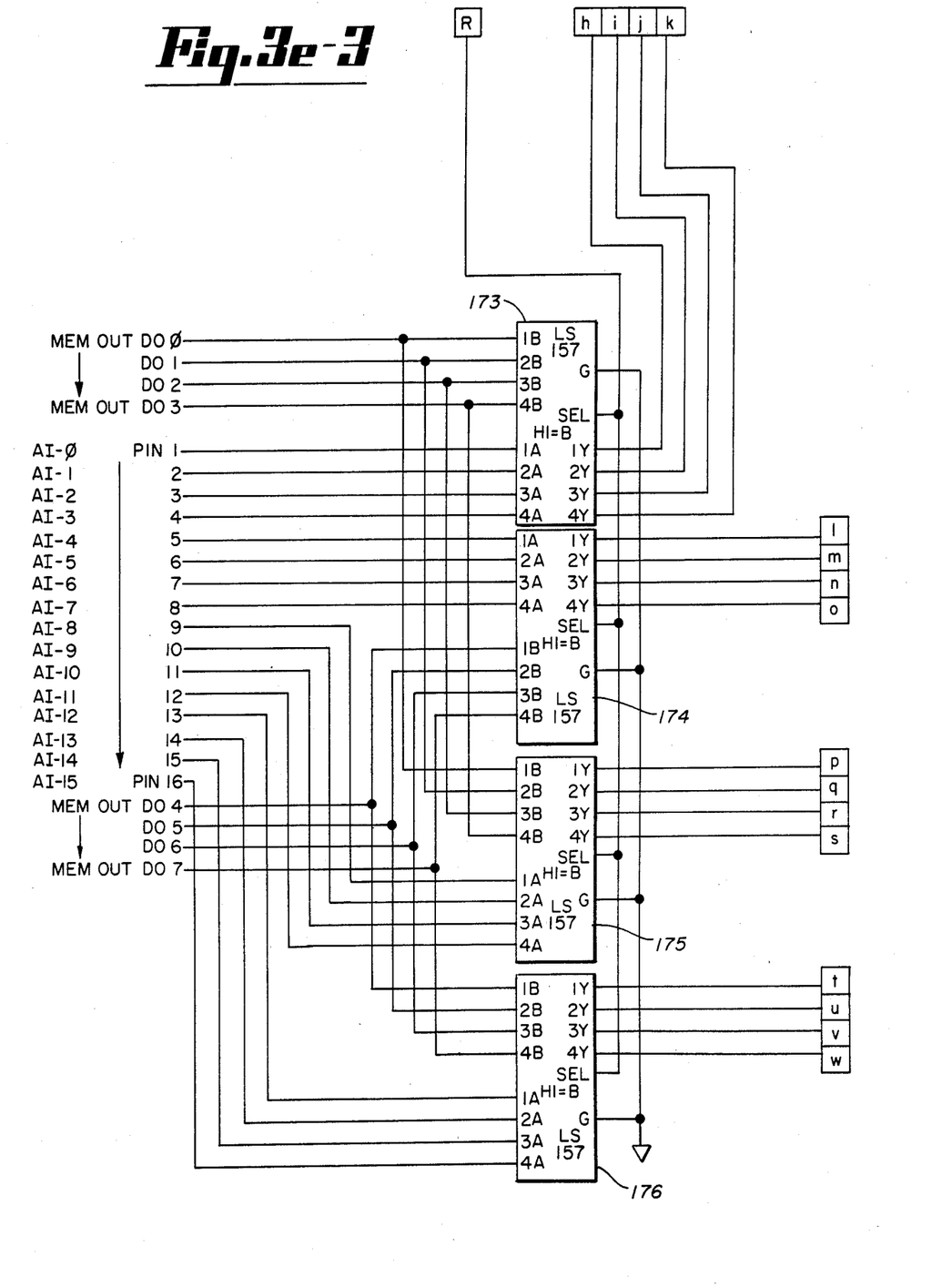
Figure 3E:
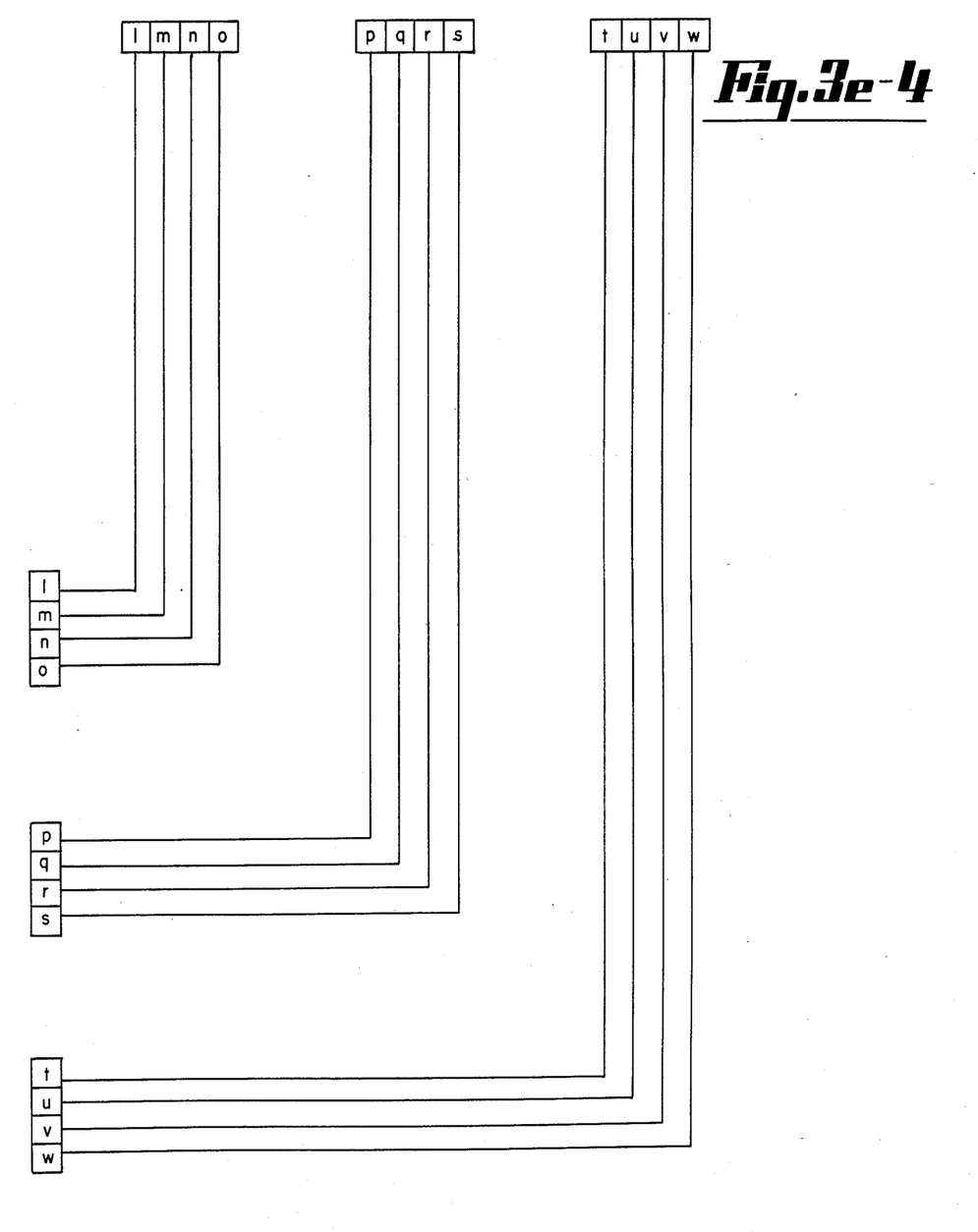

Consequently, the output connected to the display device will be the logical output in the format chosen by the computer, i.e. an AND function, an OR function, a NAND function, a NOR function, an exclusive OR function, an exclusive NOR function, a NEGATE function or a simple TRANSFER of the data. The operation occurs at the cycle time of the system and can be either displayed as a red interrupt or can be loaded into memory.

This logical analysis again has many functions and uses but for purposes of illustration can be explained in connection with the previous example of the property owner having trees, sand, and soil. By choosing the spatial features of trees and sand or grass, using the logical operators to process data and the logical functions, it is then possible to display the areas that there are trees and grass but no sand for purposes of creating a park and also the places where there is sand but no trees for purposes of a beach. Any areas in the data set which indicate that there are both trees and sand would not display. Similar applications are available for geology and medical purposes, for example, in a geological survey it might be desirable to have places where a particular type of vegetation exists and at the same time there is a seismographic indication of a void under the ground to display, while other areas having similar vegetation but no void are excluded from display. Similarly, using the exclusive OR operation the operator can select and display where either one or the other of a desired data parameter is present but not where both are present.

This logical analysis feature provides a substantial advantage over prior methods of computing which require repeated transfers to obtain similar information. For example, a normal logical operation would require loading registers with information to be desired, then performing the logical combination and then outputing the results, at least three bus cycle times. With the present invention the output is derived during the same scan that the logical operation has taken place and provides an interrupt which can overlay the image from which the data was obtained. This is extremely useful when analyzing moving images such as are obtained from a video camera on a real time basis or from a video cassette recorder. The invention thus lends itself for use in automated manufacturing such as quality control, to determine tolerances, for medical purposes, and, for example, where images are obtained of land masses by a plane flying over the land therefore providing a moving image which is to be the subject of the analysis.

An even more powerful analytical tool is incorporated into the logical analysis circuitry of the present invention. It enables the combinational analysis of any or all of the data sets stored in memory.

The criteria for analysis is input as two command words from the computer bus. The command words are latched by pairs of LS157 latches, 155, 156, and 157, 158. These command words are connected to a set of four LS85 comparators, two, 163, 164 and 165, 166, for each command word, the other input to each pair of which, 163, 164 and 165, 166, are the eight bits of memory stored at each memory address.

Selection of the data bits as an input is achieved by an appropriate signal line, 170, governing the output of the four LS157 data selectors, 173-176, shown on FIG. 3e.

The resulting circuit yields the immediate ability to analyze all data, as the data is processed, according to the criteria in the first command word, analyze all data according to the criteria in the second command word, or analyze all data according to the criteria contained in both command words. Using this method of analysis, all spatial entities and relationships can be determined from the data stored in memory. For example, from the previous examples the location of trees near the lake within the property lines, on loamy soil could be instantaneously determined. Similarly, the point where fault lines converge with a salt dome configuration covered by a particular type of vegetation on a selected property can be analyzed and all instantaneously stored and/or displayed. All analysis takes place at the video scan rate and whenever the data set equals either of the loaded computer word, or both words, an interrupt occurs which is synchronous with the video display.

Logical variations are achieved by putting different command words in the two command locations by sequentially latching the command words. Since the output in the preferred embodiment only creates an interrupt when the results are equal, alternating the bits in the command word for data sets that are to be disregarded, i.e. a 1 in the first command word and a 0 in the second command word at the same bit location will not create an equal condition. Therefore, the only data out will be those data sets where the bit in memory corresponds to the bit in both command words.

The pairs of comparators, 163 and 164, 165 and 166, are cascaded together so that when memory data bits equal data bits in the command word, a logic high is output. Both outputs are also connected to an AND gate, 182, in the same manner as a dot cursor, and the resulting display on the screen will be that an interrupt occurs at all points where the two command words equal the data being input to the comparators.

Shown on FIG. 3d is the additional circuitry which enables the output to be either an AND logical function or an OR logical function.

On FIG. 3d the AND logical function, when selected, is passed through gates, 192, 194, while the OR function is achieved by connecting the output from each of the two sets of comparators, 163, 164 and 165, 166, to AND gates 196, 198, respectively, the outputs being connected to gate 194. This will produce an interrupt when either the high order bytes are equal or the low order bytes are equal and thus produce the logical OR function. By virtue of the fact that any interrupt can write into or erase from memory the compliment of those functions can be achieved thus providing AND, NAND, OR or NOR logic for any or all of the data stored in memory all on an immediate real time, same scan basis.

The resulting display is one that is completed within one hundred sixty nanoseconds for read-alter-write cycle of the memory. As with the prior analysis of results the resulting logical analysis can be displayed simultaneously on the screen with the image being analyzed and/or can be stored in memory simply by actuating the write enable to store the output in memory, 30. This provides the ability to make two hundred fifty-six squared decisions about the data in one pass of the data and has many and varied uses similar to those discussed previously concerning land use, medical use, or quality control.

It is clear that even more esoteric analysis techniques are possible with the circuitry shown. For example, comparator, 163-166, outputs are available to produce a high signal where the result is greater than or less than the command word. These can be conveniently connected to similar circuitry or the same circuitry under computer control to identify data which meets all criteria or no criteria or exceeds a stated command word setting forth a minimum criteria and the like. These and similar variations are within the intendment of the appended claims.

The foregoing specification sets forth certain preferred embodiments and modifications of the imaging computer disclosed and some of the ways in which the invention may be put into practice including a preferred mode presently contemplated by the inventor for carrying out this invention. Other modifications of the described embodiment as well as alternative embodiments and devices for carrying out the invention, will also be apparent to those skilled in the art. All such modifications are intended to be within the spirit and scope of the following claims.

I claim:

1. A multiple image generation and analysis system for use with an analog video signal in raster format comprising:
    means for storing data comprising a plurality of addressable memrory locations, each memory location having a plurality of bit locations so that each memory location is capable of storing a plurality of data bits;
    input means for providing data to be stored in the plurality of memory locations;
    means for selectively entering the data in any one of the plurality of bit locations during and synchronized with the raster scan of the video signal;
    means for selectively accessing data stored in any of the bit locations; and
    means for selectively displaying data from any of the bit locations.

2. The multiple image generating and analysis system of claim 1 further comprising means for selectively changing the data in any one of the plurality of bit locations at any memory location.

3. The multiple image generation and analysis system of claim 1 wherein the means for entering the data comprising means for entering at least two data bits in the plurality of memory locations.

4. The multiple image generation and analysis system of claim 1 wherein the means for entering the data comprises means for entering eight data bits in the plurality of memory locations.

5. The multiple image generation and analysis system of claim 1 wherein the means for entering data comprises means for selecting the address at which to store the data.

6. The multiple image generation and analysis system of claim 1 wherein the input means comprises means for selecting one of a plurality of input devices to generate the data to be stored.

7. The multiple image generation and analysis system of claim 1 wherein the means for entering data comprises means for selecting the bit location of any address in which to store the data.

8. The multiple image generation and analysis system of claim 1 wherein the means for accessing data comprises means for selecting the address to access the data.

9. The multiple image generation and analysis system of claim 1 wherein the means for accessing data comprises means for selectively accessing all of the bit locations in the selected address.

10. The multiple image generation and analysis system of claim 1 wherein the means of accessing data comprises means for selectively accessing the same selected bit location in each of the addressable memory locations.

11. The multiple image generation and analysis system of claim 1 wherein the means for displaying data comprises means for selectively displaying all of the bit locations.

12. The multiple image generation and analysis system of claim 1 wherein the means for displaying data comprises means for selectively displaying selected bit locations in all of the addresses.

13. The multiple image generation and analysis system of claim 1 wherein the means for displaying data comprises means for selectively displaying a plurality of bit locations for all of the addresses.

14. The multiple image generation and analysis system of claim 1 wherein the means for entering data comprises means for entering data in an addressable memory location which corresponds to the location of a picture element to be displayed on a display screen by the means for displaying data.

15. The multiple image generation and analysis system of claim 1 wherein the means for displaying data comprises means for displaying any data bit on a display screen in the location on the screen which corresponds to the address in which the data bit is stored.

16. The multiple image generation and analysis system of claim 1 wherein the means for displaying data comprises means for displaying a plurality of data bits on the screen wherein each bit is displayed at a location on the screen which corresponds to the address in which each bit was stored.

17. The multiple image generation and analysis system of claim 1 wherein the means for entering the data comprises means for storing the data bits in a high resolution format and wherein the means for displaying the data causes the data bits to be alternatively displayed on different fields of a raster video display.

18. The multiple image generation and analysis system of claim 17 wherein pairs of data bits are alternatively displayed on different fields of the raster display.

19. The multiple image generation and analysis system of claim 1 wherein the means for entering the data stores the data bits in high resolution format and wherein the data bits are displayed as different pages of high resolution display.

20. The multiple image generation and analysis system of claim 1 further comprising logic means for electronically analyzing the data in the memory location.

21. The multiple image generation and analysis system of claim 20 further comprising computer means connected to the means for accessing data and the logic means for selectively controlling the logical analysis to take place.

22. The multiple image generation and analysis system of claim 21 wherein the computer means causes the data stored at each of two selected bit locations in each memory location to be connected to the logic means for logical analysis.

23. The multiple image generation and analysis system of claim 21 wherein the logic means comprises means for performing an AND function when comparing the data.

24. The multiple image generation and analysis system of claim 21 wherein the logic means is connected to perform an OR function when comparing the data.

25. The multiple image generation and analysis system of claim 21 wherein the logic means is connected to perform a NAND function when comparing the data.

26. The multiple image generation and analysis system of claim 21 wherein the logic means comprises means to perform a NOR function when comparing the data.

27. The multiple image generation and analysis system of claim 22 wherein the logic means comprises means for performing an EXCLUSIVE OR function when comparing the data.

28. The multiple image generation and analysis system of claim 22 wherein the logic means comprises means for performing an EXCLUSIVE NOR function when comparing the data.

29. The multiple image generation and analysis system of claim 21 wherein the logic means comprises means to perform a NEGATE function when comparing the data.

30. The multiple image generation and analysis system of claim 21 wherein the computer means further comprises:
   means for generating at least one computer command word of at least one data bit for logical analysis; and
   means for causing the data stored in at least one selected bit looation in each address to be connected to the logic means for comparison with the computer command word.

31. The multiple image generation and analysis system of claim 21 wherein the computer means further comprises:
   means for generating a computer command word having a plurality of data bits for logical analysis; and
   means for causing the data stored in a plurality of bit locations in each address to be connected to the logic means for comparison with the computer command word.

32. The multiple image generation and analysis system of claim 21 wherein the computer means further comprises:
   means for generating a plurality of computer command words each having at least one data bit for logical analysis; and
   means for causing the data stored in at least one selected bit location in each address to be connected to the logic means for comparison with the computer command words.

33. The multiple image generation and analysis system of claim 21 wherein the computer means further comprises:
   means for generating a plurality of computer command words each having a plurality of data bits for logical analysis; and
   means for causing the data stored in the bit locations in each address to be connected to the logic means for comparison with the computer command words.

34. The multiple image generation and analysis system of claim 33 further comprising:
   means for causing an interrupt to be displayed by the display means when the data bits from any memory location is equal to one of the computer command words.

35. The multiple image generation and analysis system of claim 33 further comprising:
   means for causing an interrupt to be displayed by the display means when the data bits from any address is equal to a plurality of the computer command words.

36. The multiple image generation and analysis system of claims 34 or 35 further comprising:
   means for storing the interrupts in memory locations corresponding to the address of the memory locations which cause the interrupt.

37. The multiple image generation and analysis system of claims 34 or 35 further comprising:
   means for erasing data bits from memory locations corresponding to the address of the memory locations which cause the interrupt.

* * * * *